United States Patent [19]

Kogane et al.

[11] Patent Number: 4,866,476
[45] Date of Patent: Sep. 12, 1989

[54] PHOTOGRAPHIC PRINTER FOR MAKING ELEMENTAL PRINTS

[75] Inventors: Mikio Kogane; Katsumi Otake, both of Tokyo, Japan

[73] Assignee: Fuji Photo Film Co., Ltd., Kanagawa, Japan

[21] Appl. No.: 207,847

[22] Filed: Jun. 17, 1988

[30] Foreign Application Priority Data

Jun. 19, 1987 [JP] Japan .................................. 62-152984

[51] Int. Cl.$^4$ .............................................. G03B 27/52
[52] U.S. Cl. ........................................ 355/40; 355/54; 355/74
[58] Field of Search .................... 355/40, 54, 74, 77, 355/52

[56] References Cited

U.S. PATENT DOCUMENTS

| | | | |
|---|---|---|---|
| 3,377,914 | 4/1968 | Jeffee | 355/52 X |
| 3,490,844 | 1/1970 | Sapp, Jr. | 355/40 |
| 3,824,336 | 7/1974 | Gould et al. | 355/52 X |
| 4,078,862 | 3/1978 | Kuwana | 355/40 |
| 4,197,004 | 4/1980 | Huribut | 355/54 X |
| 4,704,796 | 11/1987 | Gauer | 355/40 X |

Primary Examiner—Richard A. Wintercorn
Attorney, Agent, or Firm—Sughrue, Mion, Zinn, Macpeak & Seas

[57] ABSTRACT

A photographic printer makes enlarged elemental prints of portions, into which a single image frame of an original film is divided, and used to make a large size picture display. There are provided a film holder, movable in two dimensions; a position index panel with a plurality of possible positions corresponding to the portion for positioning the film holder to align the center of each portion with the printing axis of the photographic printer; a position indicating panel with a plurality of position indicating light emitting elements for selectively indicating a position where the film holder is to be placed; and an indicating member which is movable over the position indicating panel. The light emitting elements indicate the corresponding possible positions of the positioning panel. When aligning the indicating member with a light emitting element which is now emitting light, the film holder is placed in position so as to print a portion of the image frame to be printed into the printing position.

14 Claims, 7 Drawing Sheets

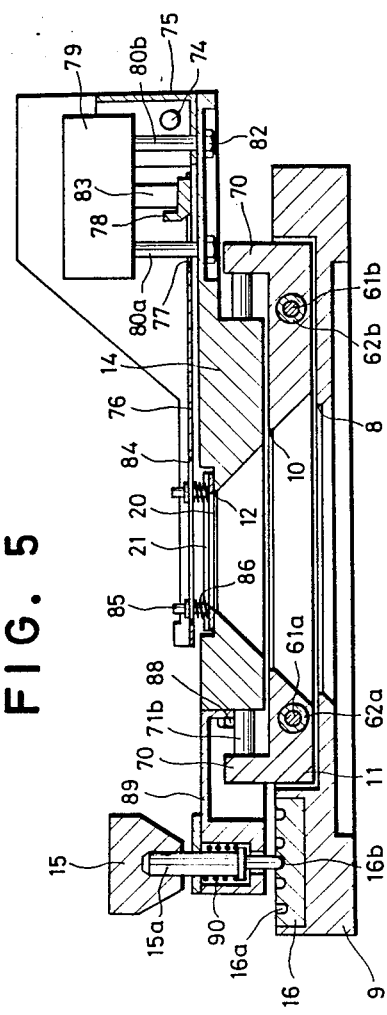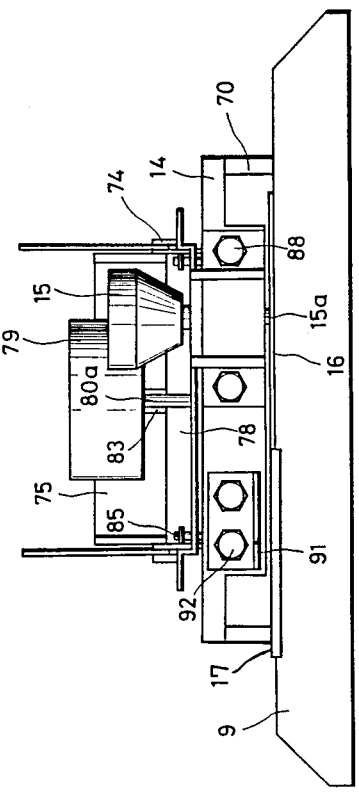

PHOTOGRAPHIC PRINTER FOR MAKING ELEMENTAL PRINTS

BACKGROUND OF THE INVENTION

The present invention relates to a photographic printer for making enlarged prints and more particularly to a photographic printer for making enlarged elemental prints of portions of a single frame of a photographic film which are used to form a large size photographic picture display.

Conventional photographic printers have negative carriers disposed between a lamp unit and a photographic paper on which a negative film is placed to make an enlarged print of a single frame thereof. One problem with making an enlarged print of a single frame of a standard format of negative film on a large size photographic paper is the printing cost, which increases as printing size or magnification ratio increases. Another problem is the magnification range of such large prints which depends on the sizes of photographic papers commercially available.

These problems can be solved by making enlarged prints of portions, into which a single frame of a negative film is nominally divided, on a regular size of photographic paper to provide elemental prints of a large size photographic picture to be displayed. The enlarged elemental prints of the respective portions are arranged in a plane to form a single picture, thereby providing a large size photographic picture display. However, it is quite hard to provide such enlarged elemental prints of the portions with conventional photographic printers.

SUMMARY OF THE INVENTION

In view of the foregoing deficiencies, it is an object of the present invention to facilitate the provision of enlarged elemental prints of portions into which a single image frame of an original film is divided.

To accomplish the above and other objects, the present invention provides a photographic printer comprising a film holder movable in two dimensions in a plane normal to the printing axis of the photographic printer so as to place portions into which a single image frame is nominally divided in a printing position in order, an operating member attached to the film holder, a positioner having a plurality of possible positions arranged in the same order as that in which the portions are arranged, for positioning the operating member to selectively place the portions in the printing position to align the center of each portion with the printing axis of the photographic printer, and a position indicator for indicating one of the possible positions of the positioner where the operating member is to be positioned so as to place in the printing position the corresponding portion to be printed.

According to a preferred embodiment of the present invention, the positioner comprises a position index panel which is detachably mounted on the photographic printer and has a plurality of position index means arranged on the position index panel, one for each possible position, each of which is engageable with the operating member, and the indicator comprises a position indicating panel detachably mounted on the photographic printer and having as many position indicating light emitting elements as there are position index means each of which indicates the corresponding position index means. The position index panel and position indicating panel may be replaced with other panels depending on a need for different formats of image frames of original films.

The light emitting elements, which may be light emitting diodes, are excited to emit light. By bringing an indicating member formed with a viewing hole to a position on the position indicating panel where an the excited light emitting element can be viewed through the viewing hole, the operating member is positioned so as to place the film holder in position, so that an intended picture is positioned in the printing position.

According to the present invention, the photographic printer can print enlarged elemental prints of portions of a single image frame of an original film while nominally dividing the single image frame into smaller portions.

BRIEF DESCRIPTION OF THE DRAWINGS

FIG. 5 is a cross sectional view of the film holder of FIG. 3

FIG. 6 is a front view of the film holder of FIG. 3;

DETAILED DESCRIPTION OF THE PREFERRED EMBODIMENT

Figure 1:
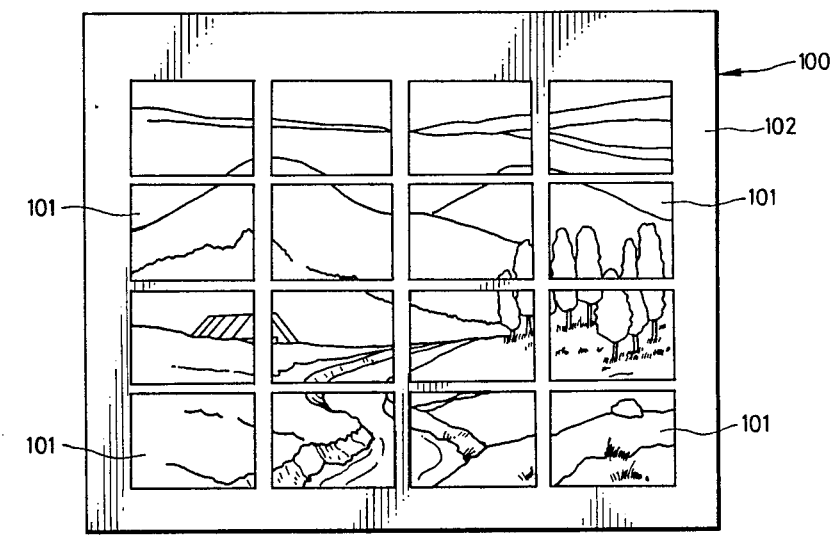
FIG. 1 is a front view of a picture display formed by using enlarged elemental prints made by a preferred embodiment of the photographic printer according to the present invention.

Referring now to FIG. 1 showing a photographic picture display 100 formed by divisional prints made by the photographic printer according to the present invention, arranged in a 4×4 matrix on a display sheet 102 as a printer holder are a plurality, for example 16 pieces in this embodiment, of enlarged divisional prints 101 which together form a single large picture. These divisional prints 101 are arranged with separation in columns and rows to display the single large picture without a feeling of visual disorder. The display sheet 102 may be made of various materials such as paper or flexible plastic. For clear display, the display sheet 102 may be either black or suitably colored when the divisional prints 101 are made by using a color photographic paper. A display panel made of cardboard, thin plastic plates or the like may be used in place of the display sheet 102.

Each divisional print 101 is provided by making a regular size, namely E-size (82×114 mm), of enlarged print from each of smaller portions into which an image frame of a negative film is nominally divided.

Figure 2:
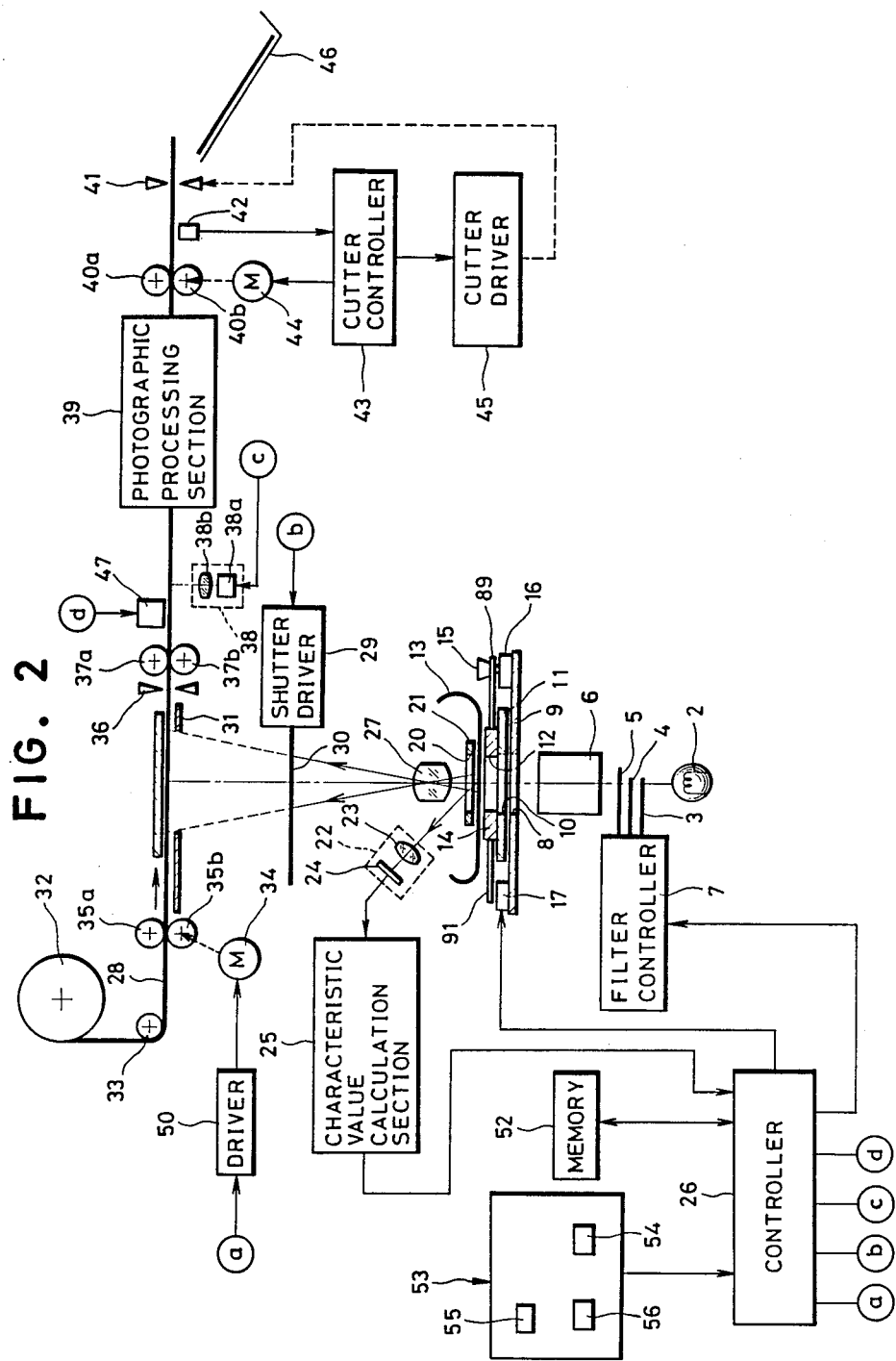
FIG. 2 is a schematic illustration showing a preferred embodiment of a photographic printer according to the present invention.

FIG. 2 shows a preferred embodiment of a photographic printer according to the present invention for making enlarged prints such as the divisional prints 101.

As shown, there are three complementary color filters 3, 4 and 5, namely cyan, magenta and yellow, controlled by a filter controller 7. Each color filter 3, 4, 5 is insertable, independently of the other two, between an illumination lamp 2, for emitting white printing light, and a mirror box 6, which comprises a square hollow tube having inner mirrored walls and top and bottom diffusion plates. The white light from the lamp 2 passes through one or more of the color filters 3, 4, or 5 into the mirror box 6 and is sufficiently diffused thereby.

Figure 3:
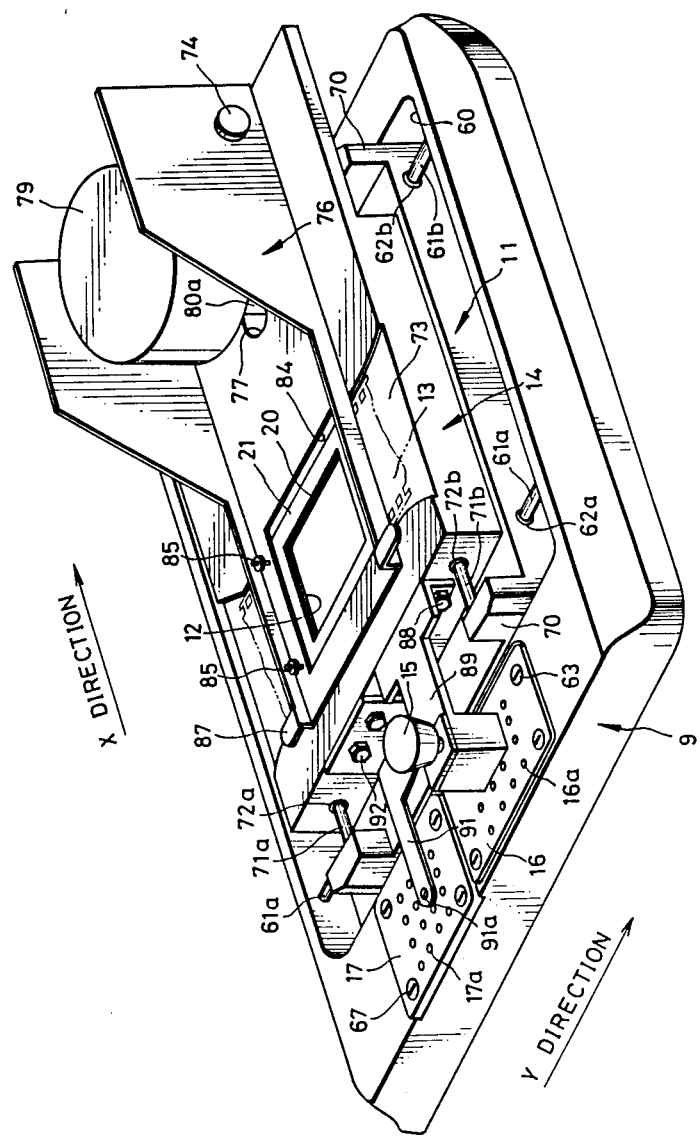
FIG. 3 is a perspective view of a film holder for the printer of FIG. 2.
Figure 4:
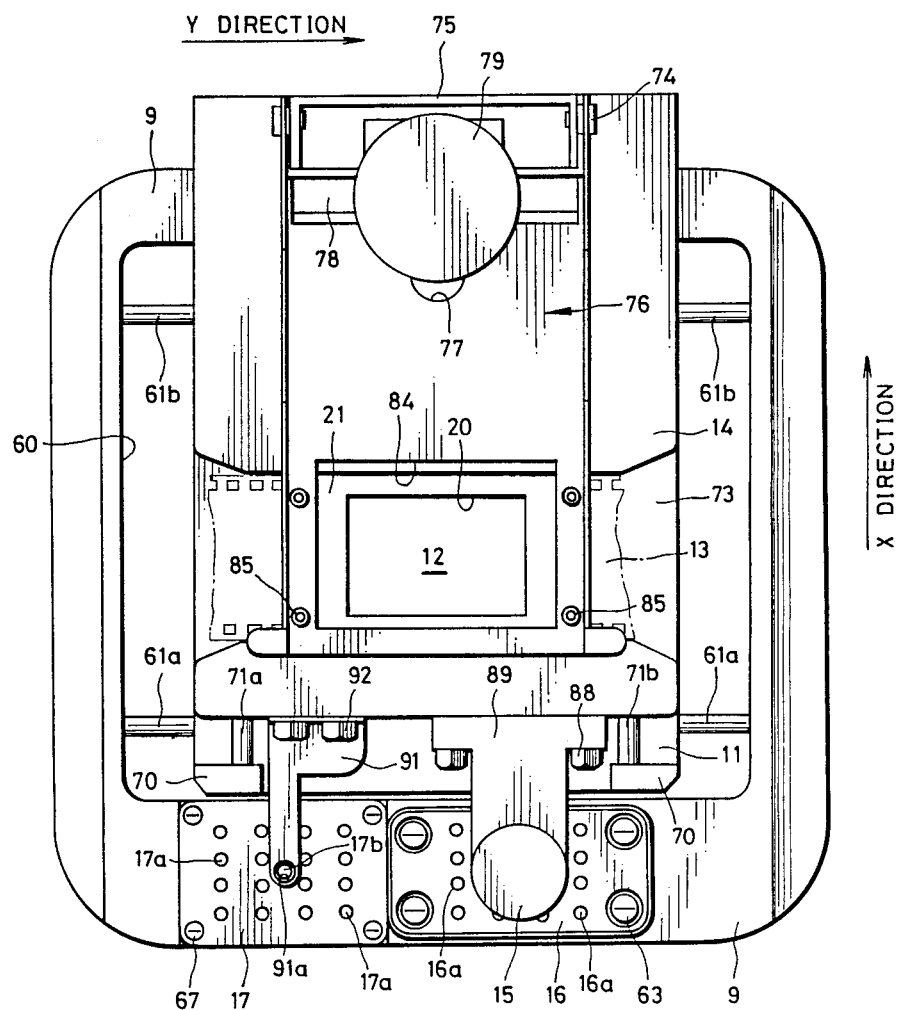
FIG. 4 is a top plan view of the film holder of FIG. 3.

After passing through a color negative film 13 placed in a printing stage in a printing optical path P, the diffused light is focused on a photographic paper 28. This printing stage includes a film holder 14 having a center exposure opening 12 and a slidable table 11 having a center exposure opening 10 which, as will be described in detail later, is movably supported by a base plate 9 having a center exposure opening 8 fixed to the printer. The film holder 14 and the slidable table 11 are slidably moved in directions perpendicular to each other. The film holder 14 is provided with a lever 89 whose outer end has a knob 15 movable up and down. The lower end of the knob 15 is engageable with a position index panel 16 fixed to the base plate 9 to locate the film holder 14 in position. The base plate 9 is attached with a position indicating panel 17 indicating positions to which the film holder 14 is selectively located. The film holder 14 is provided with an indicating member 91 which is movable over the position indicating panel 17 for indicating a position in which the film holder 14 is placed. In FIG. 2, the position indicating panel 17 is shown at a different position from in FIG. 3.

Above the film holder 14, there is a masking frame 21 having a masking opening 20. Off the upper right of the masking frame 21, there is a scanner 22 comprising a lens 23 and an image area sensor 24 to measure the whole area of an image frame of the negative film 21 to detect light intensities of a large number of picture elements into which the image frame is nominally divided. The light intensity for each picture element is transmitted to an image characteristic value detecting section 25 to provide an image characteristic value such as a large area transmittance density (LATD), a maximum density, a minimum density, a mean density for specified picture elements or the like for each color. That characteristic value in turn is sent to a controller 26 mainly comprising a microcomputer well known in the art.

An enlarging lens 27 is disposed above the printing stage in the optical path P of the illumination light. Between the printing lens 27 and a photographic paper 28, there is a shutter 30 operated by a shutter controller 29 which opens the shutter for a certain time in order to create a latent image of the image frame of the negative film 13 on the photographic paper 28.

The photographic paper 28 in the form of a roll 32 is withdrawn by means of a pair of withdrawing rollers 35a and 35b driven by a pulse motor 34 through a driver 50 so as to be placed in an exposure station formed by an exposure masking frame 31 defining an exposure aperture 31a for a desired printing size, for example an E size print. Adjacent to the exposure masking frame 31, there is a cutter 36 for cutting off the exposed part of the photographic paper 28 after a predetermined number of exposures. Besides the cutter 36, there is a pair of conveying rollers 37a and 37b and a cut mark printer 38 which comprises a light mark generator 38a and lens 38b for focusing a light mark image generated by the light mark generator 38a onto the photographic paper 28. In place of the cut mark printer 38, an inker or hole puncher may be used. A printer 47 is provided between the cut mark printer 38 and the pair of conveying rollers 37a and 37b in order to print numbers indicating locations on the negative film 13 onto the photographic paper 28. This printer 47 may be replaced by an optical number image generator for forming a latent image of a number in the photographic paper 28.

The exposed part of the photographic paper cut by the cutter 36 is transported into a well known photographic processor 39 and subjected therein to developing, bleaching-fixing, rinsing and drying. Thereafter the processed photographic paper 28 is conveyed by a pair of conveying rollers 40a and 40b driven by means of a pulse motor 44 toward a cutting position. In the cutting position, there is a cutter 41 which cooperates with a cut mark detector 42 disposed therebefore. The cut mark detector 42 detects a cut mark printed by the cut mark printer 38 and provides a cutter controller 43 with an operation signal accordingly. The cutter controller 43 stops the pulse motor 44 when a predetermined length of the photographic paper is transported after receiving the operation signal and, substantially at the same time, through a cutter driver 45 causes the cutter 41 to cut off the photographic paper to form a divisional print 101 which is delivered into a tray 46.

The pulse motor 34 for driving the withdrawing rollers 35a and 35b has its rotation controlled by a main controller 26 through the driver 50. This main controller 26 comprises a microcomputer for performing a programmed sequential control of operation which is stored in a memory 52 to control the filter controller 7, position indicating panel 17, shutter controller 29, cut mark printer 38 and printer 47. Connected to the controller 28 is an instruction entering device 81 such as a keyboard 53 including a power switching key 54, a start key 55 for starting a printing sequence of operation, and a divisional printing key 56.

Referring now to FIGS. 3 through 7 which show the printing stage, the base plate 9 is formed with a center recess 60 in which a pair of parallel guide rods 61a and 61b are disposed on opposite sides of the center exposure opening 8 and extending in one direction (which is hereinafter referred to as the Y-direction). The slidable table 11 is slidably mounted on the guide rods 61a and 61b by means of bushes 62a and 62b.

In each corner, the slidable table 11 has a bracket 70 integrally formed therewith. Between each pair of brackets 70, a guide rod 71a, 71b extends in the X-direction which is perpendicular to the Y-direction. The film holder 14 is slidably mounted on the pair of guide rods 71a and 71b by means of bushes 72a and 72b. The film holder 14 has a wide groove 73 formed with the center exposure opening 12 for receiving the negative film 13.

Figure 7:
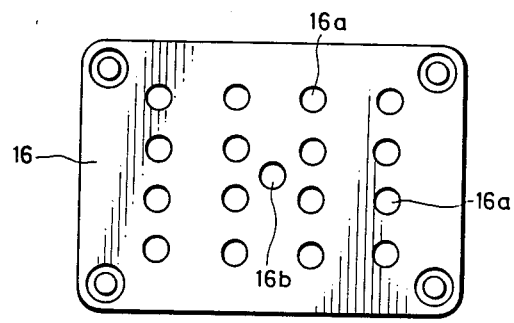
FIG. 7 is a top plan view showing a positioning panel used along with the film holder of FIG. 3.

On the upper surface of the base plate 9, there is a position index panel 16 secured at corners thereof by set screws 61. As shown in FIG. 7, this positioning index panel 16 is formed with a plurality of position index holes 16a arranged in the form of a matrix and a center hole 16a. In this embodiment, since the negative film 13 is nominally divided into a 4×4 matrix of smaller portions from which enlarged prints are to be made, through the engagement of a positioning pin 15a (see in FIG. 5) and the position index holes 16a, each position index hole 16a locates each corresponding portion in the exposure position and the center hole 16b centrally locates the center of a frame of the negative film 13 in order to measure the density of the negative film 13.

This positioning pin 15a is supported by the top end of a T-shaped lever 89 bolted to the film holder 14 at 88. The top end of the positioning pin 15a is attached to the knob 15. This positioning pin 15a is brought out the position index hole 16a or the center hole 16b by pulling up the knob 15 against a spring 90.

Adjacent to the position index panel 16, there is a position indicating panel 17 attached to the base plate 9 by set screws 67. This position indicating panel 17 is provided with a plurality of light emitting diodes (LED) 17a and a center LED 17b which are arranged correspondingly to the hole 16a and 16b of the position index panel 16. The center LED 17b is colored differently from the LEDs 17a to distinguish whether the negative film 13 is placed in position for light measurement position or divisional area printing. For example, it would be preferable to use a green LED for the index LEDs 17a and a red LED for the center LED 17b.

A pointing lever 91 bolted to the film holder 14 at 92 is movable over the position indicating panel 17 to point out a present position of the film holder. The pointing lever 91 has a viewing hole 91a formed at the top end through which any one of these LEDs 17a and 17b is viewed when the positioning pin 15a is in a corresponding position index hole 16a or 16b.

As shown in FIGS. 5 and 6, the film holder 14 is attached with a U-shaped bracket 75 at its rear end. The bracket 75 supports a masking frame holder 76 by a pivot shaft 74 for pivotal movement. Both lengthwise sides and the rear end of the masking frame holder 76 are bent upwardly to form a generally trapezoidal shape. The masking frame holder 76 is also formed with a slot 77 extending lengthwise and is provided with a cross plate 78 across the slot 77. The masking frame holder 76 is partially cut off the bracket 75.

A solenoid 79 has two legs, one leg 80a penetrating the slot 77 and the other leg 80b being mounted on the film holder 14 out of the masking frame holder 76. These legs 80a and 80b are fastened by set screws 82 to the film holder 14. A plunger 83 of the solenoid 79 is connected to a plate 78 so as to press down the mask frame holder 76 when the solenoid 79 is excited.

The masking frame holder 76 is formed at its front section with an exposure opening 84 under which a masking frame 21 is suspended by pins 85 and is forced down by springs 86 provided around the pins 85. When the masking frame holder 76 is pressed down by the plunger 83 of the solenoid 79, the masking frame 21 enters at the wide groove 73 of the film holder 14. A stem 87 extends from the masking frame holder 76 so that the holder 76 can be picked up with a finger.

Figure 8:
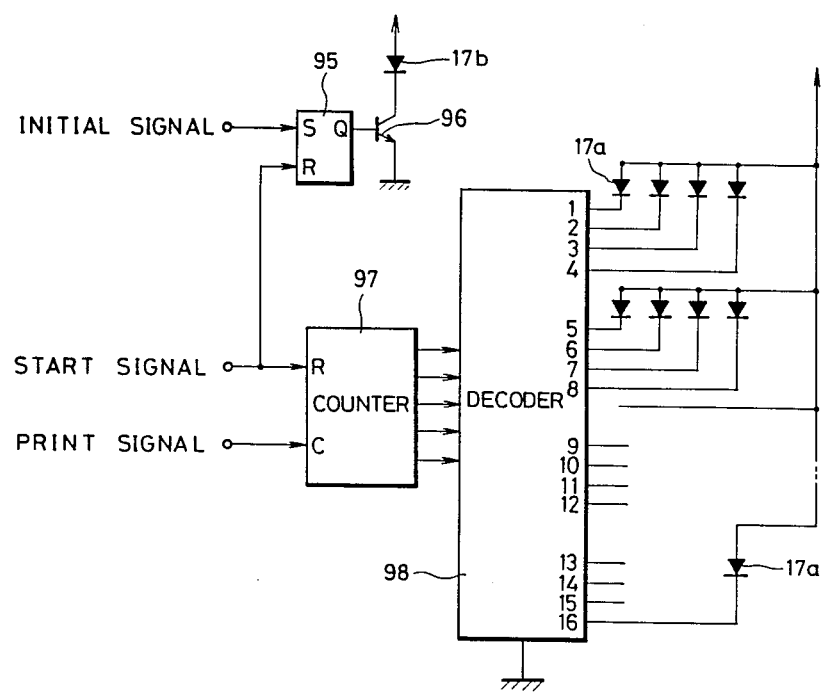
FIG. 8 is a schematic illustration showing a circuit for exciting light emitting elements of a position indicating panel in order.

Referring to FIG. 8 showing a circuit for the position indicating panel 17, the controller 26 provides an initial signal which in turn is input to a set terminal S of a flip-flop 95 either when the power switching key 57 is turned on or when all divisional prints 101 have been made. The base of a transistor 96 is connected to the output terminal Q of the flip-flop 95, and the transistor in turn is connected in series to the LED 17b. When the flip-flip 95 is set, the LED 17b emits a red light.

When the start key 55 is operated for initiating a light measurement, the controller 26 sends a start signal to the reset terminals R of the flip-flop 95 and the counter 97 to reset them. This counter 97 counts up the number of print signals which are provided, one for every printing of each portion, and are sent to a decoder 98. The decoder 98 decodes a counted number of the counter 97 to turn a corresponding output terminal to "L" level in order to cause the LED 17a connected to the "L" level output terminal to emit light.

Figure 9:
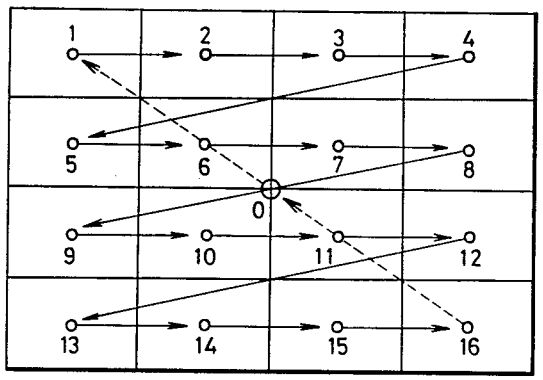
FIG. 9 is an illustration showing the order in which elemental prints are printed.

FIG. 9 depicts operation of the photographic printer of the present invention when making 16 divisional prints 101 which are to be arranged in a 4×4 matrix on the display panel 102 to display an enlarged single picture. First, to start the photographic printer, the power switch 54 is turned on. As a result, the controller 26 provides an initial signal to set the flip-flop 95 so as to excite the LED 17b at the center on the position indicating panel 17 to emit red light.

After placing the image frame of the negative film 13 in the wide groove 73 of the film holder 14 over the exposure opening 12, the negative film 13 is held down by the masking frame holder 75 so as to be kept flat between the exposure opening 20 of the masking frame 21 and the exposure opening 12 of the film holder 14. Then, while the knob 15 is pulled up against the spring 90, the film holder 14 with the pointing lever 91 is moved in two dimensions so as to view the LED 17b through the viewing hole 91a. At a position where the LED 17b is viewed through the viewing hole 91a of the pointing level 91, the knob 15 is released so that the positioning pin 15a enters in the center position index hole 16b of the position index panel 16. As a result, the center "O" of the image frame of the negative film 13 coincides with the optical axis of the printing lens 27.

When the start key 55 is operated after the centering of the film holder 14, the scanner 22 measures the image frame of the negative film 13 to detect red, green and blue components of light passed through the image frame of the negative film 13 for picture elements into which the image frame is nominally divided. The detected light intensities are sent to the characteristic value detecting section 25 which provides characteristic values such as a mean transmission density, the maximum and minimum densities, a mean density of a specified small area, etc. for each color which in turn are sent to the controller 26. The controller 26 calculates an exposure for each color based on the characteristic values according to which one or more of the color filters 3, 4, 5 are inserted into the printing path P in position.

After providing the exposures for the three color filters, the controller 26 provides a start signal for resetting the flip-flop 95 and the counter 97. By resetting the flip-flop 95, the transistor 96 is turned off, turning off the LED 17b. On the other hand, because the counter 97 is reset, the first output terminal of the counter 97 is turned to the "L" level, turning on the LED 17a in the first row, first column to emit a green light.

After pulling up the knob 15 to pull out the positioning pin from the position index hole 16b, the film holder 14 is moved to align the viewing hole 91a of the pointing level 91 with the LED 17a mitting a green light. When releasing the knob 15, the positioning pin 15a enters in a position index hole 16a corresponding to the LED 17a now emitting a green light, aligning the center of the first portion "1" of the image frame of the negative frame 13 with the optical axis of the printing lens 27.

When the print key 54 is operated after positioning the first portion of the image frame of the negative film 13, the shutter 30 opens for a certain time to expose the photographic paper 28 to an enlarged image of the first portion of the image frame of the negative film 13. At the end of the exposure, the pulse motor 34 is turned to transport the photographic paper 28 by one frame to place an unexposed part of the photographic paper 28 in the exposure position.

The controller 26 then provides the counter 97 with a print signal. The counter 97 counts the print signal to send the counted total number to the decoder 98. The decoder 98 causes an LED in the first row, second column connected to the second output terminal thereof to turn on to emit a green light.

In the same way as described above, the knob 15 is handled to place the second portion of the image frame of the negative film 13 in the printing position for exposure. At this time, a margin provided on the photographic paper 28 between the printed image frame of the first portion of the image frame and the last printed image frame of the last portion of a previous image frame is in alignment with the optical axis of the cut mark printer 38. In synchronism with the exposure of the second portion of the image frame of the negative film 13, the light mark generator 38a generates a cut mark at which the photographic paper 28 at the margin is optically printed. On the other hand the printer 47 is actuated to print a portion position number in the matrix, for example "1-1" (which indicates the first row, the first column) on the back of the photographic paper 28.

In such a way, the third through 16th portions of the image frame of the negative film 13 are sequentially printed as well as cut marks and portion position numbers on the photographic paper 28. After the printing of the last portion "16", the counter 97 counts a print signal to turn off the LED 17a in the fourth row and the fourth column on the position indicating panel 17. Since the controller 26 counts the number of operations of the print key 56, it provides an initial signal to turn on the LED 17b when counts equal to a number of exposures of all portions of the image frame of the negative film 13 have been counted. Thus, a printing process to make enlarged print of all divisional areas of a single image frame is finished. In a single printing process, all portions are printed with a same exposure.

Thereafter, the exposed part of the photographic paper 28 on which the latent images of the portions of the image frame of the negative film 13 have been formed is cut off by the cutter 36 and transported into the photographic processor to be subjected to the necessary processing. The processed photographic paper 28 then is transported toward the cutter 41. A predetermined number of revolutions of the pulse motor 44 are made after the cut mark detector 42 detects a cut mark, and the cutter controller 43 stops the pulse motor 44 and causes the cutter driver 45 to actuate the cutter 41, cutting off the enlarged divisional print 101 of each portion. The enlarged divisional prints 101 are ejected into the tray 46.

Although in the above embodiment, the film holder 14 is moved in the Y-direction so as to print the portions of an image frame of each column frame by frame, the film holder 14 may be moved in the X-direction to print the portions of each row frame by frame. This is done by changing connections between the LEDs 17a and the terminals of the decoder 98. The enlarged divisional prints 101 are arranged on the display panel 102 as was described previously with respect to FIG. 1.

Figure 10:
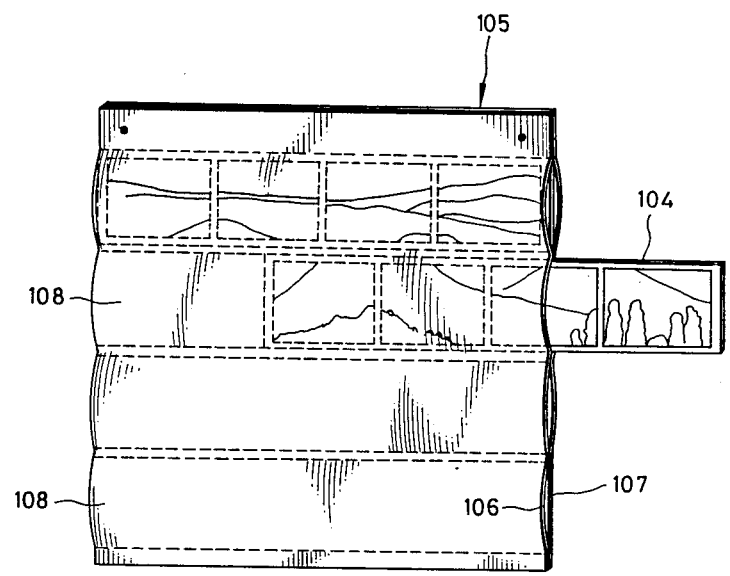
FIG. 10 is a front view partially showing a different kind of picture display.

FIG. 10 shows another form of a photographic display 105 which comprises a plurality of enlarged print strips 104 each including a row of divisional images of the portions into which a single image frame of the negative film 13 is nominally divided, and a display envelope sheet as a print holder which comprises transparent flexible front and back sheets 106 and 107 which are adhered to each other along several lines equidistant from one another to form a plurality of open ended envelopes 108. The plurality of enlarged print strips 104 are inserted into the envelopes 108 through the end openings. To make an enlarged print strip including a column of divisional images of the portions into which a single image frame is nominally divided. It is necessary to place the negative film 13 in the negative holder 14 frontside back and to print an image rotated through 45 degrees. A dope prism which is well known to those skilled in the art is used to print an image in such a manner. It is to be noted that a cut mark is printed between each two adjacent enlarged print strips and a row or column number is printed on the back of each enlarged print strip.

Although the present invention has been fully described by way of various embodiments thereof with reference to the accompanying drawings, various changes and modifications within the spirit of the invention will be apparent to those skilled in the art. For example, each image frame may be divided into a desired matrix such as a $3\times3$, $5\times5$, $6\times6$ or $5\times6$ matrix, or the like. These patterns of portions can be provided by the provision of position index and position indicating panels having corresponding patterns of position index hole arrangements and position indicating LED arrangements, respectively. Further, an LED for printing the next portion may flash while an LED for the printed portion may be turned on continuously. Also, all the LEDs may be turned on before exposures and turned off in order after every exposure. Thus, the scope of the present invention is limited only by the appended claims which follow immediately.

What is claimed is:

1. A photographic printer for making enlarged print elements of portions into which a single frame of an original film is nominally divided, said photographic printer comprising:

a film holder, movable in two dimensions in a plane normal to a printing axis of said photographic printer, for holding said original film;

a manually-operated operating member, cooperating with said film holder, for moving said film holder in said two dimensions;

positioning means, having a plurality of possible positions located thereon corresponding to said portions, for selectively positioning said operating member to place said film holder in position in order to align the center of each of said portions with said printing axis; and position indicating means for selectively indicating said plurality of possible positions on said positioning means where said operating member is to be positioned on said positioning means.

2. A photographic printer as defined in claim 1, wherein said positioning means comprises an index panel which is detachably mounted on said photographic printer and has a plurality of position index means, one for each of said plurality of position, each said position index means being able to retain said operating member to place said film holder in position.

3. A photographic printer as defined in claim 2, wherein said position index means is an index hole for receiving said operating member.

4. A photographic printer as defined in claim 1, wherein said position indicating means comprises a position indicating panel detachably mounted on said photographic printer and having a plurality of light emitting elements arranged in correspondence with ones of said plurality of position index means, a circuit for exciting one of said plurality of light emitting elements for indicating one of said plurality of possible positions where said operating member is to be positioned, and an indicating member fixed to said film holder and being brought into alignment with said excited light emitting element.

5. A photographic printer as defined in claim 4, wherein said position indicating means further indicates a position where said operating member is presently positioned.

6. A photographic printer as defined in claim 5, wherein said light emitting element comprises a light emitting diode.

7. A photographic printer as defined in claim 6, wherein said indicating member has a hole through which an excited light emitting element is viewed.

8. A photographic printer as defined in claim 5, further comprising means for causing said excited light emitting element to be turned on until the end of the exposure of the selected area.

9. A photographic printer as defined in claim 5, further comprising means for causing said excited light emitting element to flash.

10. A photographic printer for making enlarged print elements of portions into which a single image frame of an original film is nominally divided, said photographic printer comprising:
  a film holder, movable in two dimensions in a plane normal to a printing axis of said photographic printer, for holding said original film;
  a manually operated operating member, attached to said film holder, for moving said film holder in said two dimensions;
  a positioning panel, detachably mounted on said photographic printer and having a plurality of possible positions arranged in correspondence with said portions and to a center of said single image frame in which said operating member is selectively positioned for positioning said film holder to selectively align the centers of said portion with the printing axis of said photographic printer;
  a position indicating panel, being detachably mounted on said photographic printer and having a plurality of position indicating light emitting elements arranged in correspondence with said portions and said center positions;
  a circuit for selectively exciting said light emitting elements for indicating one of said portions and said center portion where said film holder is to be positioned; and
  an indicating member attached to said film holder and movable over said position indicating panel to be aligned with said excited light emitting element, to place said film holder in position.

11. A photographic printer as defined in claim 10, wherein said indicating member has a hole through which said excited light emitting element is viewed.

12. A photographic printer as defied in claim 10, wherein said positioning panel has positioning holes at said possible positions, said operating member including an engaging member which is inserted in an appropriate one of said positioning holes to place said film holder in position.

13. A photographic printer as defined in claim 10, wherein said light emitting element for said center position emits a light different in color from those for said portions.

14. A photographic printer as defined in claim 10, wherein said circuit excites said light emitting element for the center position first and then the others of said light emitting elements for corresponding ones of said portion in order of their arrangement.

* * * * *